United States Patent [19]

Capobianco et al.

[11] Patent Number: 4,650,307
[45] Date of Patent: Mar. 17, 1987

[54] ELECTROMAGNETIC ACTUATOR

[75] Inventors: Richard N. Capobianco; David L. White, both of Rochester, N.Y.

[73] Assignee: Eastman Kodak Company, Rochester, N.Y.

[21] Appl. No.: 781,597

[22] Filed: Sep. 30, 1985

[51] Int. Cl.$^4$ ............................ G03B 9/02; G03B 9/24
[52] U.S. Cl. ................................. 354/234.1; 354/230; 354/271.1; 335/222
[58] Field of Search ...................... 354/230, 234.1, 250, 354/254, 255, 271.1, 274; 335/222, 223, 224, 225; 350/269

[56] References Cited

U.S. PATENT DOCUMENTS

| | | | |
|---|---|---|---|
| 3,348,463 | 10/1967 | Nerwin | 354/274 |
| 3,349,682 | 10/1967 | Nerwin | 354/274 |
| 3,561,847 | 2/1971 | Kitsopoulos et al. | 354/271.1 |
| 3,572,906 | 3/1971 | Kitsopoulos et al. | 350/269 |
| 4,333,722 | 6/1982 | Lee | 354/234.1 |
| 4,410,251 | 10/1983 | Lee | 354/234.1 |
| 4,504,132 | 3/1985 | Martin et al. | 354/234.1 |
| 4,514,064 | 4/1985 | Kurosu et al. | 354/234.1 |
| 4,531,820 | 7/1985 | Petersen | 354/234.1 |

*Primary Examiner*—A. A. Mathews
*Attorney, Agent, or Firm*—William C. Dixon

[57] ABSTRACT

An electromagnetic actuator operable with a source of electric current has two overlapping, oppositely movable armatures that are mounted on resiliently flexible cantilever spring members and coupled together by resiliently flexible spring elements, to provide coordinated cooperative movements of the armatures when energized. The armatures have conductive coils thereon that are connectable to the current source through the spring members and spring elements. A permanent magnet and a pair of flux return plates are disposed near the armatures to provide a suitable magnetic path through the coils. Current flowing through the coils in the magnetic path generates oppositely directed forces on the two armatures. Structure is provided for constraining the coupling spring elements to move in only one direction when such forces are generated, thereby facilitating coordination of desired armature movements in directions substantially opposite to each other and perpendicular to the one direction.

10 Claims, 5 Drawing Figures

ELECTROMAGNETIC ACTUATOR

BACKGROUND OF THE INVENTION

1. Field of the Invention

The present invention relates generally to electromagnetic actuators, and particularly to such actuators as are embodied in an electromagnetic diaphragm or shutter having a flexible linkage that couples oppositely moving aperture blades together to coordinate their respective movements.

2. Description of the Prior Art

U.S. Pat. No. 4,333,722 discloses an electromagnetic actuator of the type having a current-conducting armature movable in a magnetic field, together with means for urging the armature toward a rest position. The armature has a planar coil thereon, and is movable in the plane of the coil. The armature is mounted for such movement by a flexure hinge, which not only biases the armature toward its initial position but also conducts current to and from the coil. The flexure hinge is described as a λ-hinge that defines a virtual pivot point about which the armature rotates. An aperture blade is disposed at one end of the armature for movement thereby. A preferred embodiment of that actuator has two such armatures superposed in a magnetic field and separately mounted for opposing movements by respective λ-hinges. The two armatures thus move in opposite directions when current flows through their coils, thereby changing the relative positions of their aperture blades. While the actuator there disclosed may prove satisfactory for some applications, a need still exists for an actuator of the same general type which is more efficient, more reliable, and more durable. In particular, an improved way of coordinating respective movements of cooperating armatures in such an actuator is needed to ensure consistently repeatable responses to successive actuations over an extended period of use.

SUMMARY OF THE INVENTION

Accordingly, an object of the present invention is to provide an electromagnetic actuator of the foregoing type that is more efficient, more reliable, and more durable than those known in the prior art. That object has been achieved by the invention herein claimed.

The invention finds utility in an electromagnetic actuator that is operable in association with a source of electric current and which comprises first and second armatures having electrically conductive means thereon. The actuator is provided with means actuable for connecting the source of electric current to the conductive means, and means for producing a magnetic field near the conductive means. Also provided are means for resiliently, flexibly mounting the two armatures for cooperative respective movements thereof relative to the magnetic field producing means, and means for resiliently, flexibly coupling the armatures to each other to coordinate their respective movements, whereby coordinated cooperative movements of the two armatures relative to the magnetic field producing means are effected in response to actuation of the connecting means.

In a preferred embodiment of such an actuator, the armature mounting means is electrically conductive and connectable between the current source and the armature conductive means; and the armature coupling means also is electrically conductive, and is connected between the first armature conductive means and the second armature conductive means.

More particularly, in the preferred embodiment as illustrated and described herein, the armature mounting means includes first and second electrically conductive cantilever spring members having a fixed end connectable to the current source and a movable end connected to the armature conductive means. The armature coupling means includes first and second electrically conductive elongate spring elements having first and second ends, the first ends thereof being connected to the armature conductive means, the second ends being connected to each other.

Each of the armatures includes first and second end portions and a central area intermediate the end portions, and the conductive means on each armature includes a spiral coil disposed in its central area with input and output ends thereof in the first end portion. The movable end of the first cantilever spring member is connected to the input end of the coil on the first armature, and the first end of the first elongate spring element is connected to the output end of the coil on that armature. The first end of the second elongate spring element is connected to the input end of the coil on the second armature, and the movable end of the second cantilever spring member is connected to the output end of the coil on that armature. Current thus flows from its source sequentially through the first spring member, the first armature coil, the first and second spring elements, the second armature coil, the second spring member, and thence back to the source, to effect the desired coordinated cooperative movements of the two armatures in response to actuation of the current source connecting means.

Also provided in the illustrated preferred embodiment are means fixed relative to the magnetic field producing means for guiding movements of the connected second ends of the elongate spring elements in one direction only, to facilitate coordinated cooperative movements of the second end portions of the two armatures in respective predetermined directions that are substantially opposite to each other, said one direction being substantially perpendicular to such predetermined opposite directions.

As illustrated, the two armatures are disposed in variable overlapping relation to each other, and the second end portions thereof together include means adapted to define a variable aperture. The aperture varies during movements of the armature second end portions in their predetermined opposite directions to provide a variable-aperture diaphragm or shutter.

Each armature includes a substantially planar insulative substrate with its conductive coil formed on the substrate. The magnetic field producing means includes a substantially flat permanent magnet overlying the armatures in proximity to each coil thereon, a ferromagnetic cover plate overlying and adjacent to the magnet, and a ferromagnetic base plate underlying the armatures in proximity to each coil thereon. The magnet and the two plates together thus provide both a magnetic flux path through each armature coil and a gap wherein the central area of each armature is movable upon actuation of the current source connecting means.

A significant advantage of this invention is that it achieves its aforementioned object in providing an electromagnetic actuator with an extraordinarily long useful life.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, wherein like reference numerals denote like elements and wherein.

DESCRIPTION OF THE PREFERRED EMBODIMENT

Because certain parts of electromagnetic actuators are well known, the following description is directed in particular to those elements forming, cooperating directly with, or relating to the present invention. Elements not specifically shown or described herein are selectable from those known in the relevant art.

Figure 1:
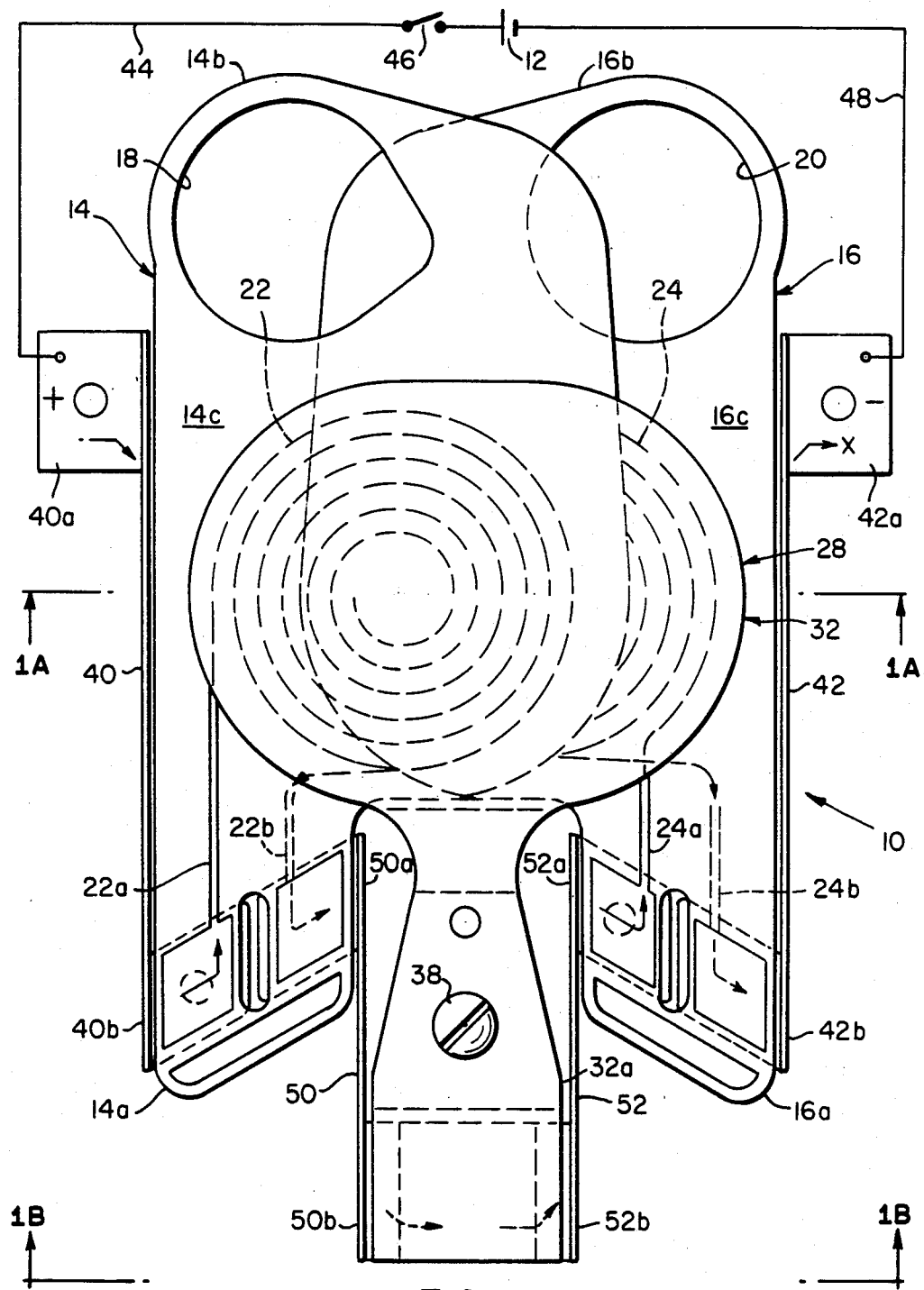
FIG. 1 is a schematic plan view of an electromagnetic actuator constructed in accordance with the preferred embodiment of the present invention.

Illustrated in FIG. 1 is an electromagnetic actuator 10 constructed in accordance with the preferred embodiment of the invention. In this embodiment, the actuator is adapted to function as a moving-coil shutter which is operable when connected to a source of electric current 12. Actuator 10 comprises first and second overlapping armatures 14 and 16, respectively, which constitute opposing aperture blades of the shutter. Armature 14 includes first and second end portions 14a and 14b, respectively, and a central area 14c intermediate those end portions. Similarly, armature 16 includes first and second end portions 16a and 16b, respectively, and a central area 16c intermediate those end portions. The second end portions 14b and 16b have respective apertures 18 and 20 therein which together function to define a variable aperture during operation of the actuator. Disposed in central areas 14c and 16c are conductive means in the form of respective spiral coils 22 and 24. Coil 22 has input and output ends 22a and 22b, respectively, extending into first end portion 14a, while coil 24 has input and output ends 24a and 24b, respectively, extending into first end portion 16a.

The two armatures may be photofabricated from a sheet of polyethylene terephthalate film clad with copper on both sides. The coil pattern may thus be formed on each side using photolithography in the relatively thin layer of copper, the pattern then being built up to the desired thickness by further plating on the thin copper pattern. All of the copper on the film substrate not required for the current path, or for strengthening the armatures at their spring connections, can be removed in the fabrication process. Either a separate layer or a coating on the armatures must then be applied to prevent electrical contact between them. As viewed in FIG. 2, coil 22 starts at its input end 22a and proceeds on the top surface of armature 14 in a clockwise inward spiral to and through a center hole 26, from which it emerges on the bottom surface and then continues in a clockwise outward spiral and terminates at output end 22b. Similarly, coil 24 commences at its input end 24a and proceeds on the top surface of armature 16 in a counterclockwise inward spiral to and through a center hole (not shown), from which it emerges on the bottom surface and then continues in a counterclockwise outward spiral to its output end 24b.

Figure 1A:
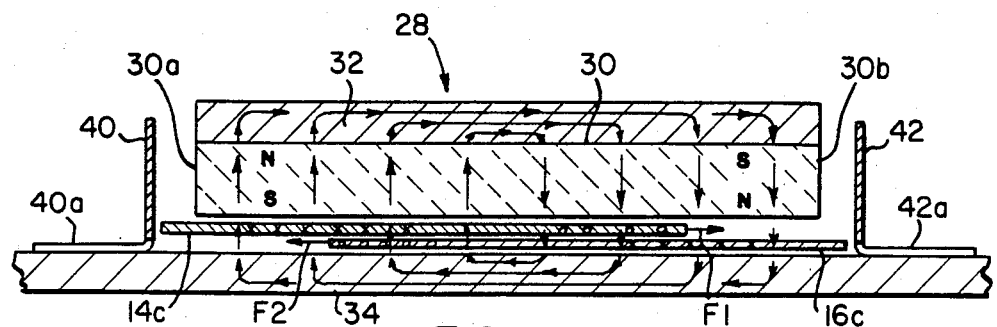
FIG. 1A is a sectional view taken along line 1A—1A of FIG. 1.
Figure 1B:
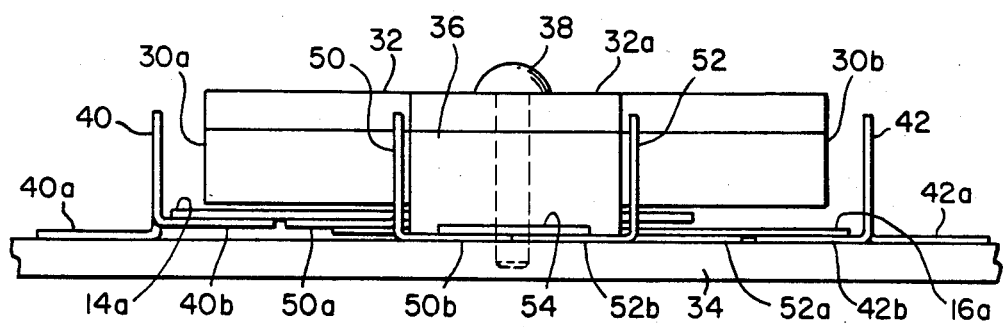
FIG. 1B is an end view taken from line 1B—1B of FIG. 1.

Disposed near the conductive coils 22 and 24 on armatures 14 and 16 are means for producing a magnetic field. As best shown in FIG. 1A, the magnetic field producing means comprise a substantially flat, oval-shaped permanent magnet 30, a ferromagnetic cover plate 32, and a ferromagnetic base plate 34. Magnet 30 is suspended from cover plate 32 in overlying proximity to coils 22 and 24, while base plate 34 closely underlies the coils. Magnet 30 is magnetized in a direction perpendicular to its top and bottom surfaces. The left half 30a of the magnet is magnetized with its north magnetic pole at the top surface and its south magnetic pole at the bottom surface, while the right half 30b of the magnet is magnetized with its south magnetic pole at the top surface and its north magnetic pole at the bottom surface, all as indicated by the letters N and S in FIG. 1A. Preferably, plates 32 and 34 are made of porcelainized steel to provide efficient flux return paths between the mentioned poles of the magnet. Magnet 30, plate 32, and plate 34 together thus provide a magnetic flux path through coils 22 and 24, as indicated schematically in FIG. 1A by the plurality of arrows running through the magnet, plates, and armatures. It will be noted that a gap is provided between the bottom surface of magnet 30 and the top surface of plate 34 so that the two armatures can move freely therein when energized. As shown in FIGS. 1 and 1B, cover plate 32 is cantilever-mounted over magnet 30 by means of a cover plate extension 32a, which is secured to base plate 34 by a plastic spacer 36 and a cap screw 38. The aforementioned gap may thus be varied simply by altering the height dimension of spacer 36.

Means for resiliently, flexibly mounting the two armatures for cooperative respective movements thereof relative to the magnetic field producing means are provided by first and second electrically conductive cantilever spring members 40 and 42. Spring member 40 has one end 40a thereof that is fixedly secured to base plate 34 and electrically connectable, through a conductor 44 and switch 46, to current source 12. The opposite end 40b of spring member 40 is fixedly secured to first end portion 14a of armature 14 and electrically connected to input end 22a of coil 22. End 40b is resiliently movable relative to end 40a by reason of the resiliency of the perpendicular mid-portion of spring member 40 extending between those ends (see FIG. 1B). Similarly, spring member 42 has one end 42a thereof that is fixedly secured to base plate 34 and electrically connected, through a conductor 48, to current source 12, and has an opposite end 42b that is fixedly secured to first end portion 16a of armature 16 and electrically connected to output end 24b of coil 24, end 42b being resiliently movable relative to end 42a because of the resiliency of the perpendicular mid-portion of spring member 42 (compare FIGS. 2 and 3). Fixed end portions 40a and 42a of the spring members may be soldered directly to base plate 34 to provide fixed electrical connections to conductors 44 and 48 respectively.

Means for resiliently, flexibly coupling armatures 14 and 16 to each other to coordinate their respective cooperative movements are provided by first and second electrically conductive elongate spring elements 50 and 52, each having first and second ends. First end 50a of spring element 50 is fixedly secured to first end portion 14a of armature 14 and electrically connected to output end 22b of coil 22. Similarly, first end 52a of spring element 52 is fixedly secured to first end portion 16a of armature 16 and electrically connected to input end 24a of coil 24. The second ends 50b and 52b of spring elements 50 and 52, respectively, are both fixedly secured and electrically connected to each other by an overlapping connector plate 54 soldered to those ends as best shown in FIG. 1B. Spring elements 50 and 52 alternatively may be made as one integral part. In this case, because of the resiliency of the perpendicular mid-portions of spring elements 50 and 52 (again, see FIG. 1B), the first ends 50a and 52a of those elements are resiliently movable relative to each other and relative to the joined second ends 50b and 52b (again, compare FIGS. 2 and 3). The mentioned resiliently flexible elongate mid-portions of both the spring members 40 and 42 and the spring elements 50 and 52 can be formed simply by bending those portions into a plane that is perpendicular to the plane of the armatures. Copper-clad beryllium has been found to be a suitable material for the spring members and spring elements. In addition to the mentioned through-holes in the armatures at their coil centers, through-holes are needed to permit appropriate inter-surface connections between spring member end 40b and coil end 22a and between spring element end 52a and coil end 24a.

Figure 2:
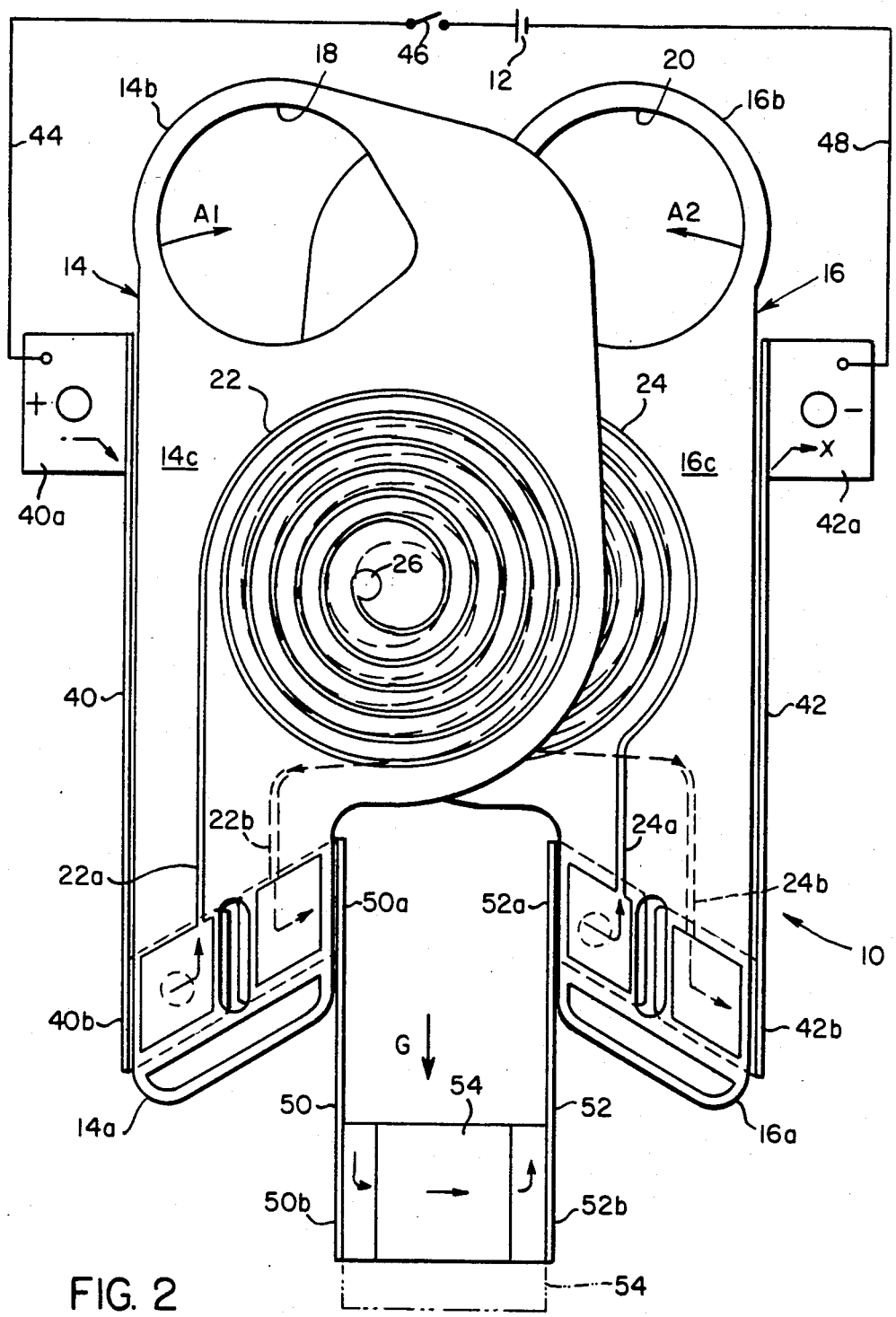
FIG. 2 is a plan view similar to FIG. 1, showing the actuator with its magnetic field producing means removed and in its unenergized, at-rest state.
Figure 3:
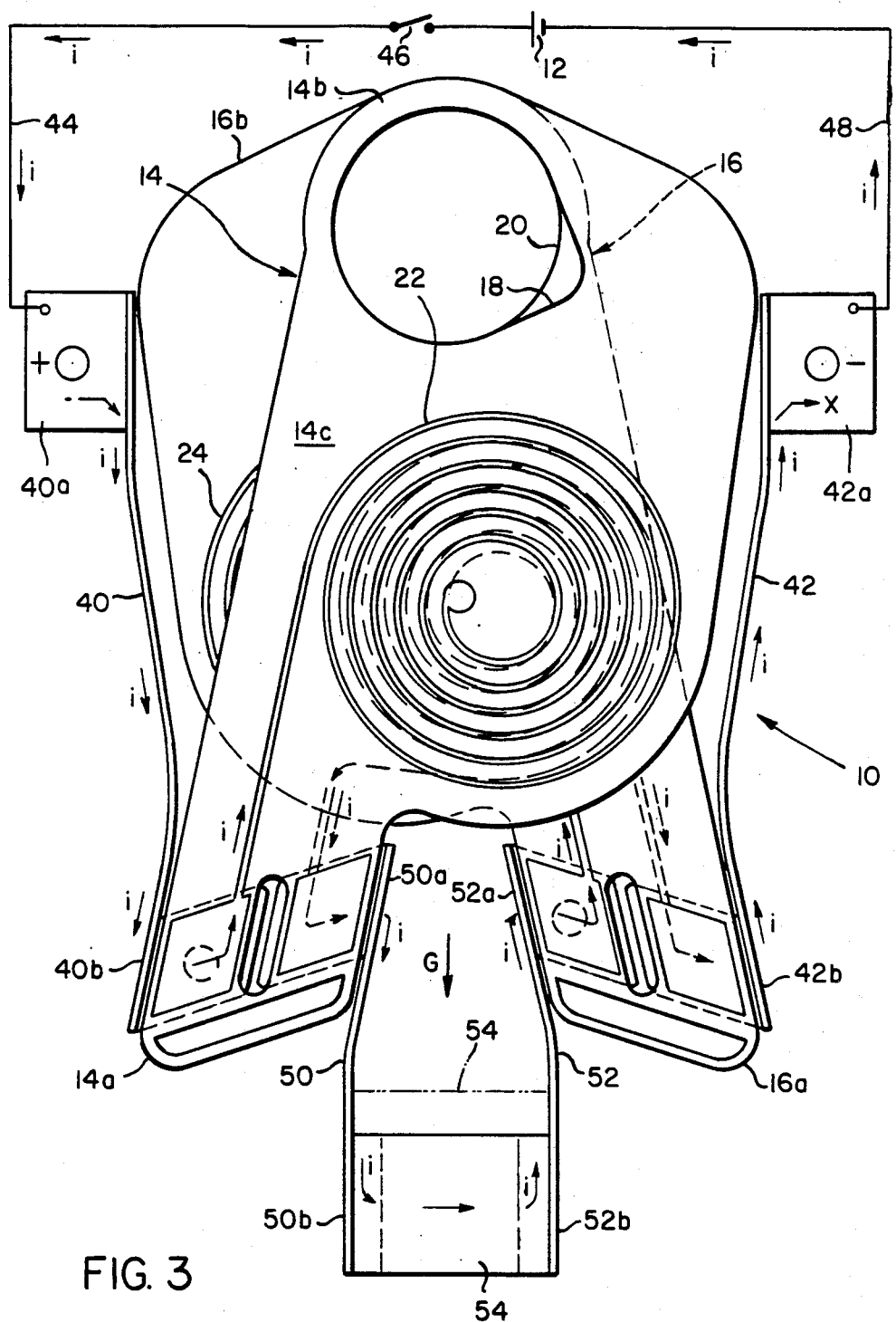
FIG. 3 is a plan view similar to FIG. 2 but showing the actuator in its fully energized state.

By virtue of the electrical conductors and connections described above, closing switch 46 causes current to flow from current source 12, via conductor 44, sequentially through spring member 40, coil 22, spring elements 50 and 52, coil 24, spring member 42, and thence, via conductor 48, back to source 12. Switch 46 thus serves as an actuable means for electrically connecting current source 12 to the conductive coils on armatures 14 and 16. The current flow is shown in FIG. 3 by the arrows designated i and in FIG. 1A by the arrow heads and tails on the two armatures. The arrow heads (small o's) indicate current flowing out of, and the tails (small x's) indicate current flowing into, the plane of the drawing. By well-known interaction between such current flow through the armature coils and the magnetic field passing perpendicularly therethrough, the central areas 14c and 16c of the armatures move in substantially opposite directions, i.e., to the right and left, respectively, under the influence of generated forces F1 and F2 (see FIG. 1A). The opposing movements of areas 14c and 16c are magnified at end portions 14b and 16b, which move in substantially opposite directions A1 and A2, respectively, so as to shift apertures 18 and 20 toward each other and into increasing overlapping relationship (as may be seen by comparing FIGS. 2 and 3). The extent of that shift, and the effective aperture size resulting therefrom, can be controlled by varying the amount of current flowing through the coils. Such movements of end portions 14b and 16b in substantially opposite directions A1 and A2, to achieve the desired effective aperture size, are facilitated by guiding the joined second ends 50b and 52b of spring elements 50 and 52 to move in one direction only. That one direction, indicated by the arrow G in FIGS. 2 and 3, is substantially perpendicular to the opposing directions A1 and A2. Such guiding of ends 50b and 52b is provided by the flux plate extension 32a and spacer 36, which are fixedly secured to base plate 34 as already described.

In operation, when switch 46 is actuated to its closed position, current flows through coils 22 and 24 in the magnetic field depicted in FIG. 1A. The resulting oppositely directed forces F1 and F2, tending to move armatures 14 and 16 into greater overlapping relationship, cooperate with the resiliently flexible mounting and coupling means 40, 42 and 50, 52, respectively, so as to cause the coordinated cooperative armature movements discussed above. FIGS. 2 and 3 show the positions and configurations of the actuator parts before and after, respectively, their respective movements undertaken to provide a maximum aperture size. In FIG. 2, the moved position of joined ends 50b, 52b and plate 54, reached after their movement in the direction of arrow G, is shown in broken lines. Similarly in FIG. 3, the initial position of those ends and plate 54, occupied before such movement, is shown in broken lines. The described combination of cooperating parts and interconnections has proven effective in providing an actuator capable of producing many rapid and reliable responses over an extraodinarily long service life, all without need of coupling pins or other forms of rigid linkage. For example, a shutter embodiment of this actuator as tested has opened and closed a 0.4-inch-diameter aperture in 0.005 seconds over a lifetime in excess of 100,000 cycles.

The invention has been described in detail with particular reference to the preferred embodiment thereof, but it will be understood that variations and modifications can be effected within the spirit and scope of the invention.

What is claimed is:

1. An electromagnetic actuator operable in association with a source of electric current, said actuator comprising:
    first and second armatures having electrically conductive means thereon;
    means actuable for connecting the source of electric current to said conductive means;
    means for producing a magnetic field near said conductive means;
    means for resiliently flexibly mounting said armatures for cooperative respective movements thereof relative to said producing means; and
    means for resiliently flexibly coupling said armatures to each other to coordinate said movements thereof;
whereby coordinated cooperative movements of said armatures relative to said producing means are effected in response to actuation of said connecting means.

2. An electromagnetic actuator as claimed in claim 1 wherein said mounting means is electrically conductive and connectable between the current source and said conductive means.

3. An electromagnetic actuator as claimed in claim 2 wherein said coupling means is electrically conductive and connected between said conductive means on said first armature and said conductive means on said second armature.

4. An electromagnetic actuator as claimed in claim 1 wherein said mounting means includes first and second electrically conductive cantilever spring members having a fixed end connectable to the current source and a movable end connected to said conductive means.

5. An electromagnetic actuator as claimed in claim 4 wherein said coupling means includes first and second electrically conductive elongate spring elements having first and second ends, said first ends being connected to said conductive means, said second ends being connected to each other.

6. An electromagnetic actuator as claimed in claim 5 wherein each of said armatures includes first and second end portions and a central area intermediate said end portions; wherein said conductive means on each armature includes a spiral coil disposed in said central area with input and output ends thereof in said first end portion; wherein said movable end of said first cantilever spring member is connected to said input end of said coil on said first armature; wherein said first end of said first elongate spring element is connected to said output end of said coil on said first armature; wherein said first end of said second elongate spring element is connected to said input end of said coil on said second armature; and wherein said movable end of said second cantilever spring member is connected to said output end of said coil on said second armature; whereby current flows from the current source sequentially through said first spring member, said first armature coil, said first and second spring elements, said second armature coil, said second spring member, and thence back to the source, to effect said coordinated cooperative movements of said armatures in response to actuation of said connecting means.

7. An electromagnetic actuator as claimed in claim 6 further comprising means fixed relative to said producing means for guiding movements of said connected second ends of said elongate spring elements in one direction only, to facilitate coordinated cooperative movements of said second end portions of said armatures in respective predetermined directions substantially opposite to each other.

8. An electromagnetic actuator as claimed in claim 7 wherein said one direction is substantially perpendicular to said predetermined opposite directions.

9. An electromagnetic actuator as claimed in claim 8 wherein said armatures are disposed in variable overlapping relation to each other; wherein said second end portions thereof together include means adapted to define a variable aperture; and wherein the aperture varies during said movements of said second end portions in said predetermined opposite directions to provide a variable-aperture diaphragm or shutter.

10. An electromagnetic actuator as claimed in claim 9 wherein each of said armatures includes a substantially planar insulative substrate with said conductive coil formed on said substrate; and wherein said producing means includes a substantially flat permanent magnet overlying said armatures in proximity to each coil thereon, a ferromagnetic cover plate overlying and adjacent to said magnet, and a ferromagnetic base plate underlying said armatures in proximity to each coil thereon, said magnet and said plates together providing both a magnetic flux path through each coil and a gap wherein said central area of each armature is movable upon actuation of said connecting means.

* * * * *